United States Patent [19]

Smith et al.

[11] Patent Number: 5,193,039
[45] Date of Patent: Mar. 9, 1993

[54] PERMANET MAGNET EASY-AXIS BIASED MAGNETORESISTIVE HEAD

[75] Inventors: Alan B. Smith, Lincoln; Michael Mallary, Berlin, both of Mass.

[73] Assignee: Digital Equipment Corporation, Maynard, Mass.

[21] Appl. No.: 686,596

[22] Filed: Apr. 17, 1991

[51] Int. Cl.⁵ .............................. G11B 5/39
[52] U.S. Cl. ................................... 360/113
[58] Field of Search .............. 360/113; 324/252; 338/32 R

[56] References Cited

U.S. PATENT DOCUMENTS

| | | | |
|---|---|---|---|
| 4,663,684 | 5/1987 | Kamo et al. | 360/113 |
| 4,713,708 | 12/1987 | Krounbi et al. | 360/113 |
| 4,733,455 | 3/1988 | Nakamura et al. | 29/603 |
| 4,903,158 | 2/1990 | Smith | 360/113 |
| 4,972,284 | 11/1990 | Smith et al. | 360/113 |

OTHER PUBLICATIONS

Markham et al., Magnetoresistive Head Technology, Proceedings of the Symp. on Magnetic Materials, Process & Devices, EM Soc., vol. 90-8 (1990).
Smith et al., An Improved Thin Film Permanent Magnetic Material and Novel Magnet Design for Magnetoresistive Sensor Biasing, IEEE Trans. on Magnetics, vol. 26, No. 5, Sep. 1990, pp. 2409-2411.
Uchida et al., A Non-Shielded Mr Head with Improved Resolution, IEEE Trans. On Magnetics, vol. MAG-18, No. 6, Nov. 1982, pp. 1152-1154.

Primary Examiner—Robert S. Tupper
Attorney, Agent, or Firm—Ronald E. Myrick; Barry N. Young; Ronald C. Hudgens

[57] ABSTRACT

Method and apparatus for supplying bias to a magnetoresistive element in an encapsulated thin film head for reducing the likelihood of generation of Barkhausen noise when reading flux from a magnetic storage disk. The invention achieves a relatively uniform easy axis bias field in an easy to implement manner by creating a magnetic bias structure on the encapsulated heat at the same time as providing the contact pads for the MR element.

16 Claims, 4 Drawing Sheets

PERMANET MAGNET EASY-AXIS BIASED MAGNETORESISTIVE HEAD

BACKGROUND OF THE INVENTION

The present invention relates to magnetoresistive magnetic read and read/write heads, and more particularly, to method and apparatus for applying easy-axis bias to the magnetoresistive element of a magnetoresistive (MR) head.

A magnetic recording head can write digital data on a magnetic storage disk by varying the orientation of the magnetization (i.e., magnetic domains or groups of domains) within the disk's magnetic storage layer. The boundaries between oppositely oriented magnetic domains are called "transitions", and it is these transitions which represent stored data. A magnetoresistive magnetic head reads (i.e., retrieves) this stored data from the moving disk by sensing magnetic flux changes caused by the stored transitions passing by close enough to the pole tip to couple into the pole and which flux is then carried to and interacts with the magnetoresistive element. More particularly, the vertical component of the stray flux emanating from transitions recorded in the medium and conveyed up through the pole tip rotates the magnetization of the magnetoresistive element, which effects a detectable resistive change in the element. This resistive change is employed for data detection.

As seen in the top view of FIG. 1(A) and the sectional view of FIG. 1(B), a simplified magnetoresistive head 10 includes a magnetoresistive element 12 coupled to a magnetic pole 14. Pole 14 defines a narrowed pole tip portion 14a which terminates in a pole tip 16 at the air bearing surface (ABS) of the head, and has a separate yoke portion 14b at the back of the head. The magnetoresistive element magnetically couples the pole's tip and yoke portions. The head flies over, and with its ABS essentially parallel to, the surface of rotating magnetic storage disk 17 for capture of flux from passing transitions on disk 17. The captured flux travels from the disk, through tip portion 14a, through magnetoresistive element 12, through yoke portion 14b, and then returns back to the disk.

A closed sensing/detection circuit is created by coupling the magnetoresistive element, via its leads 18, to a detection circuit 20. The detection circuit 20 applies a constant dc bias current to the magnetoresistive element, such that changes in the magnetoresistive element's resistance are detected as a change in voltage level in the sensing/detection circuit. Hence, variations in the element's resistance, detected as variations in the voltage level of the magnetoresistive sense signal and correlated with the transitions detected by the magnetoresistive element, can be correlated with detection of stored data for data recovery purposes.

In addition to the applied sense current, a magnetoresistive element requires two further species of biasing. Transverse or hard axis biasing (see arrow H) is applied to the magnetoresistive element to cant its magnetization in the central portion of the magnetoresistive element at 45 degrees to the easy axis, which drives the magnetoresistive element into a linear response mode. This linearity eases the data recovery task of the detection circuit.

Longitudinal or easy axis biasing (see arrow E) is applied along the length of the magnetoresistive element to force it into a single magnetic domain or a series of domains in a single orientation, which keeps domain walls from forming in the element and thus prevents Barkhausen noise, i.e., sudden jumps in the magnetoresistive sense signal attributed to signal-field-induced movement of domain walls in the magnetoresistive element. An easy axis field of a few Oersteds will typically prevent domain wall formation.

U.S. Pat. No. 4,903,158 discloses a magnetoresistive head with a permanent magnet easy axis biasing structure having the same (or nearly the same) physical geometry as the magnetoresistive element (called a sense film) itself. In this arrangement, a similar but opposite demagnetization field is generated in this biasing structure as is generated in the sense film. These demagnetizing fields complimentarily cancel each other, and therefore the tendency of forming multiple and disordered domains in the magnetoresistive sense film is reduced, therefore reducing the likelihood of Barkhausen noise.

This known device includes a soft magnetic layer (such as permalloy) deposited on a non-magnetic substrate, with an $SiO_2$ insulation layer formed thereover and a 400 Å magnetoresistive sense film deposited on the $SiO_2$ layer. Electrical bonding pads are next formed on the magnetoresistive sense film for conveyance of the sense signal to the detection circuit. The constant dc sense current through the magnetoresistive sense film magnetizes the soft layer generally along the current path, which in turn biases the magnetic moment, or orientation, of the magnetoresistive sense film magnetization at about 45 degrees to the magnetoresistive current path into a linear response mode. Next, a 1000 Å coating of $SiO_2$ is deposited on the sense film/contact pad structure followed by a layer of magnetically hard material (about 1000 Å) is deposited atop this coating. This assembly is exposed to a strong magnetic field in a first direction so as to permanently magnetize the magnetically hard layer. The magnetoresistive sense film is then exposed to a weaker magnetic field in an opposite direction so that the magnetic moment of the magnetoresistive film is oriented in the direction of the external magnetic field of the magnetically hard layer.

For a detailed discussion of magnetoresistive head technology, see Markham and Jeffers, MAGNETORESISTIVE HEAD TECHNOLOGY, Proceedings Of The Symposium On Magnetic Materials, Processes, and Devices, Electromechanical Society, Vol. 90-8, pp. 185-204 (1990), the contents of which are incorporated herein by reference.

It is an object of the present invention to provide a magnetoresistive thin film head having magnetic easy axis biasing supplied from a magnetic source formed without process complexity.

It is another object of the present invention to provide a magnetoresistive thin film head having magnetic biasing supplied from a magnetic source not immediately adjacent to the magnetoresistive element so as to avoid the possibility of electrical shorts occurring between the source and the element.

SUMMARY OF THE INVENTION

These objects are well met in the presently disclosed method and apparatus for supplying bias to a magnetoresistive element in a thin film head for reducing the likelihood of Barkhausen noise being generated when reading flux from a magnetic storage disk. The invention achieves a relatively uniform easy axis bias field in an easy to implement manner.

An encapsulated thin film magnetic head for sensing of flux from a magnetic storage disk in practice of the invention may take the form of an element-in-the-yoke type or element-in-the-gap type head. Easy axis bias is supplied by a magnetic source formed on the encapsulated head in a plane above the plane of the MR element and separated from the MR element by a distance sufficient to negate the likelihood of electrical shorts between the magnetic source and the MR element. Hard axis bias may be provided via the write coil or via a soft adjacent layer formed near or on the MR element, or may be provided along with easy axis bias by the magnetic source formed on the encapsulated head. Preferably the magnetic source on the encapsulation layer is a permanent bar magnet, although other active and passive magnetic structures are also within the scope of the invention.

In an element-in-the-yoke embodiment of the invention, a thin film magnetic head for sensing of flux from a magnetic storage disk includes a base structure, which may include a first magnetic pole formed on a non-magnetic substrate, and a magnetoresistive read pole formed on the base structure. The read pole includes a pole tip portion and a yoke portion which are coupled to each other via a magnetoresistive element. The read pole portions are made of high-permeability material, typically thicker than the MR element, so as to enhance flux conduction. The magnetoresistive element is coupled toward its respective ends to respective sense leads. The sense leads terminate at pads which penetrate an encapsulation layer, although an additional magnetic pole structure may be first formed over the read pole prior to forming the encapsulation layer. The head further includes a magnet structure formed on the encapsulation layer for providing bias to the magnetoresistive element. This biasing structure may be incorporated into both monopole and multi-pole magnetoresistive heads.

In an element-in-the-gap embodiment of the invention, at least one magnetic pole lies between a magnetic source formed on the head encapsulation layer and the MR element. The tip of that pole is tapered to permit magnetic interaction between the magnetic source and the MR element for supply of easy axis bias thereto.

A method for forming a magnetically biased MR head according to the invention includes forming a bottom pole over a non-magnetic substrate, and forming a magnetoresistive element thereover upon an intermediate insulation layer. Leads are also formed, extending out from non-central locations on the MR element. The central portion of the MR element, i.e., that portion between the leads attachment locations, defines the active region of the element. Another insulation layer is formed over the MR element in preparation for deposition of the read pole tip portion and yoke portion, which are then formed accordingly. These read pole portions are formed of soft magnetic material, such as NiFe.

A combination of insulation layers are then formed over the read pole (with a write coil preferably formed within the layers if the head is to have a write capability). The top pole is deposited and formed over this structure. The head is now enclosed in a protective encapsulation layer. The encapsulation layer is planarized to enable further processing and which exposes the ends of the element's leads. (Also, if a write coil is included, then the ends of the write coil leads are also exposed.) This portion of the above-described head is conventional.

If the finished head were to be conventional, a metallic seed layer, such as a layer 2000 Å thick, would be formed over this structure, with gold contact pads being formed on this seed layer (such as by masked deposition) over the location of, and thus electrically coupled to, the exposed element leads'ends. However, in the present invention, a high coercivity (hard) magnetic seed layer, such as a NiCo layer 2000 Å thick, is deposited over the planarized encapsulation layer. Now, using an appropriately modified mask, an additional gold bar structure is formed along with the contact pads by thru-mask gold deposition upon the high coercivity magnetic seed layer. The resulting plated gold structures serve to mask the locally underlying magnetic seed layer so that as etching of the exposed seed layer (i.e., not underlying the pads and bar) proceeds, three magnetic structures of gold upon high coercivity seed layer are formed on the encapsulation layer.

The resulting structure of this head includes contact pads for coupling the magnetoresistive element via its leads, respectively, to a detection circuit, and also a permanent bar magnet (i.e., the magnetic seed layer portion under the gold bar). The bar magnet will be formed long enough so as to present an essentially uniform longitudinal field over the length of the MR element or at least to the active portion of the MR element lying between the leads for providing biasing thereto. With the longitudinal axis of the bar magnet aligned with the longitudinal axis of the magnetoresistive element, a single domain configuration can be established in the MR element, as will reduce the likelihood of unwanted Barkhausen noise.

More particularly, easy axis bias is provided to the MR element by the resulting magnetic seed layers structures underlying the pads and bar, with the layer underlying the bar dominating this effect. The magnetic seed layer structures underlying the pads may be used to provide a transverse hard axis bias component such as by being formed of dissimilar size or location. Alternatively the seed layer under the gold bar may be characterized (in shape or orientation) to also provide the hard axis bias itself. For example, the bar magnet magnetization may be aligned with the MR element to supply easy axis bias or canted so as to supply both easy and hard axis bias.

As a result of the foregoing, biasing can be supplied to a magnetoresistive head without additional process complexity, since the bar magnet is formed simply by modifying the conventional mask already required for forming the contact pads, along with substituting a high coercivity seed layer for the conventional seed layer.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF THE PREFERRED EMBODIMENT

Figure 1B:
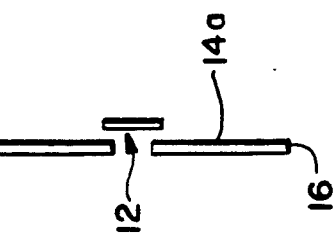
FIG. 1A and 1B provide a top view (A) and a side view through line 1B—1B (B) of a simplified prior art MR head.
Figure 1A:
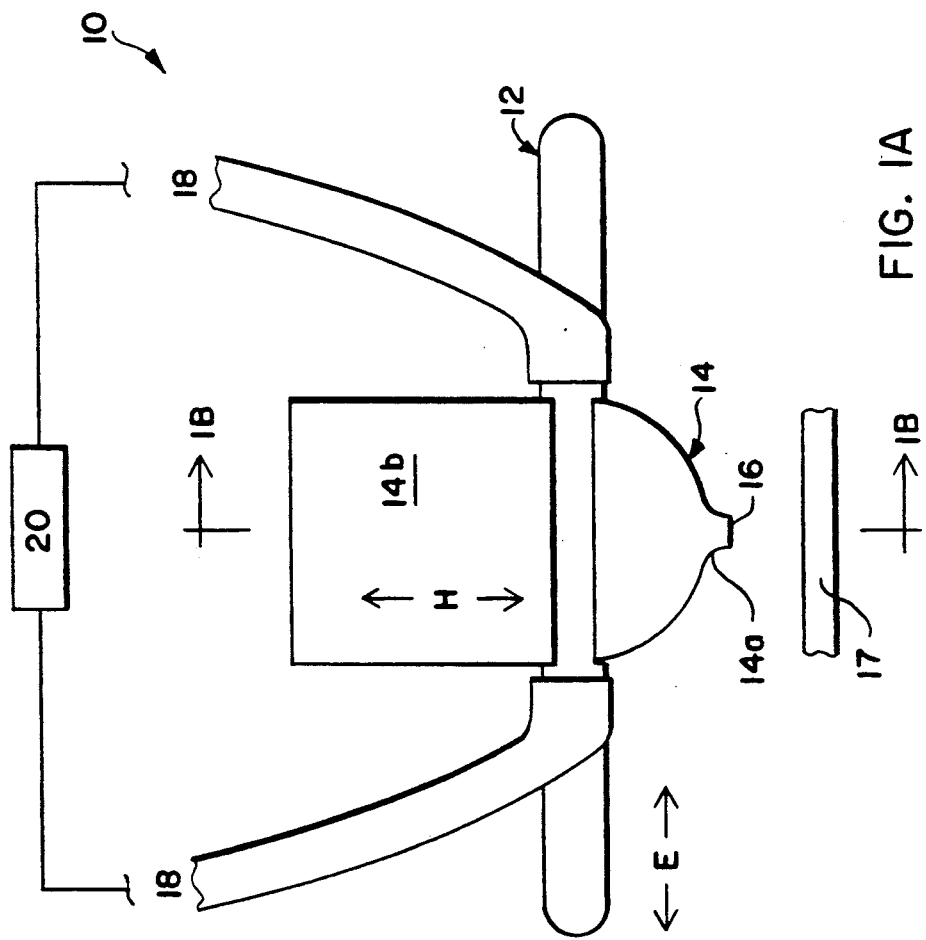

A three pole magnetoresistive head 30 in practice of an embodiment of the present invention is shown in FIG. 2(A-D). A bottom pole 34 is formed over nonmagnetic substrate 32, and a magnetoresistive element 38 is formed thereover upon an intermediate insulation layer 36. Leads 46a, 46b are also formed, extending out from non-central locations on the MR element. The central portion of the MR element, i.e., that portion between the leads attachment locations, defines the active region 38a of MR element 38.

Another insulation layer 40 is formed over the MR element in preparation for deposition of the read pole tip portion 42 and yoke portion 44, which are then formed accordingly. These read pole portions are formed of soft magnetic material, such as NiFe.

A combination of insulation layers 46 are then formed over the read pole (with a write coil 48 formed within layers 46 if the head is to have a write capability). The top pole 50 is deposited and formed over this structure. The head is now enclosed in a protective encapsulation layer 52.

Figure 2A:
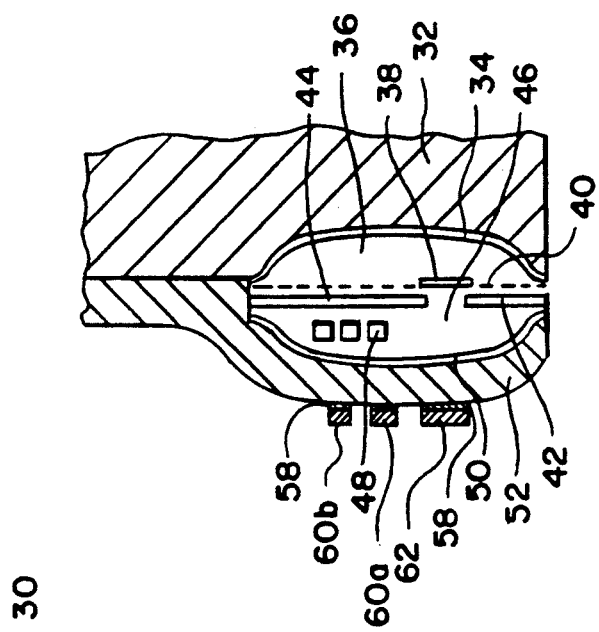
FIG. 2A, 2B, 2C, 2D, and 2E provide a side view (2A) and a schematic view (2B) of an embodiment of the invention; a top view (2C) of a partially completed slider incorporating the head Of FIG. 2(A–B); a partial top view (2D) of a completed slider incorporating the head of FIG. 2(A-B), and a deposition mask (2E) employed in forming the bias structure of this embodiment.
Figure 2B:
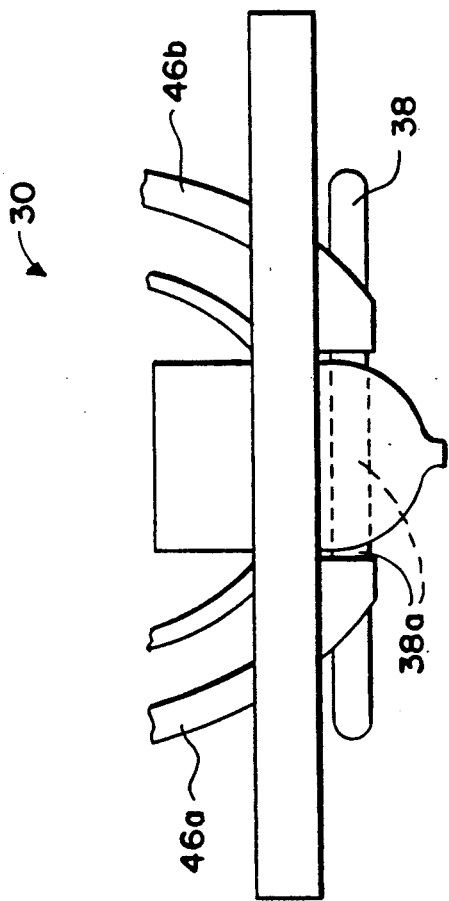
Figure 2C:
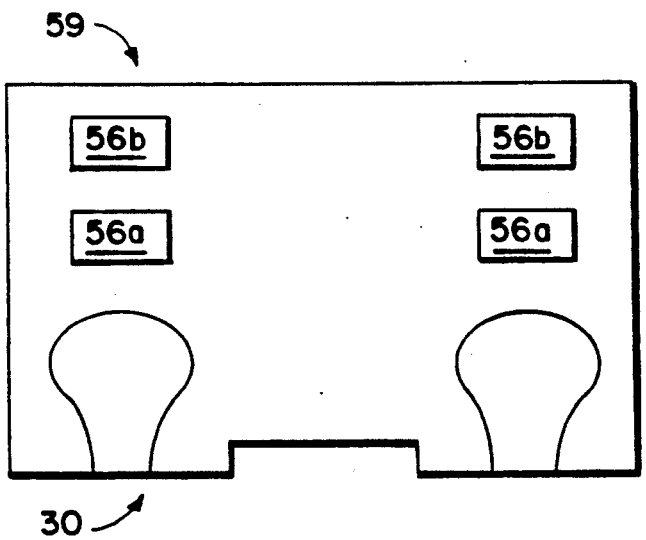
Figure 2D:
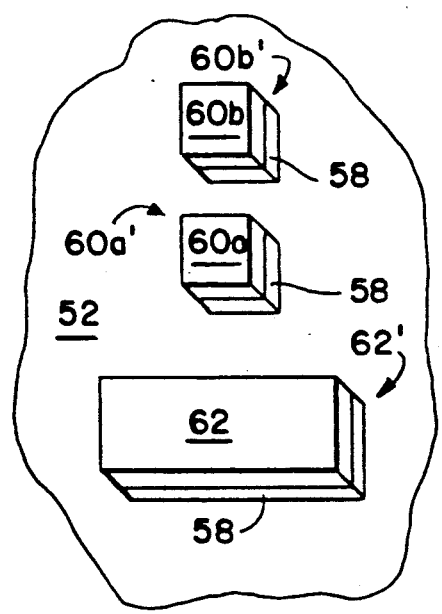
Figure 2E:
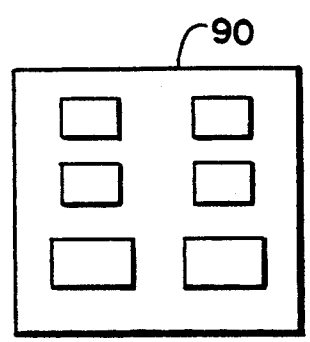

The head is formed in a larger physical structure called a slider, and which has aerodynamic features for interaction with the disk over which it flies. The top 59 of a slider incorporating head 30 is shown in FIG. 2(C), wherein it will be appreciated that the encapsulation layer 52 has been planarized to enable further processing and which planarizing exposes the ends 56a, 56b of the element's leads 46a, 46b, respectively. Although head 30 is not exposed, it is shown here as a matter of convenience, so as to locate the exposed lead ends. (Also, if a write coil is included, then the ends of the write coil leads are also exposed and would be shown.) This portion of the above-described head 30 is conventional.

If the head of FIG. 2(A-D) were conventional, a metallic seed layer, such as a layer 2000 Å thick, would be formed over this structure, with gold contact pads being formed on this seed layer (such as by masked deposition) over the location of, and thus electrically coupled to, the exposed element ends 56a, 56b. However, in the present invention, a high coercivity (hard) magnetic seed layer 58, such as a NiCo layer 2000 Å thick, is deposited over the planarized encapsulation layer 52.

At this point, contact pads must be formed on the seed layer, such as by masked deposition of gold. This is achieved in the present invention by using an appropriately modified mask 90 (see FIG. 2(E)), with which an additional gold bar structure 62 is formed along with contact pads 60a, 60b, again by thru-mask gold deposition, upon the high coercivity magnetic seed layer 58. Now the portion of the seed layer which connects structures 60a, 60b and 62 must be removed, such as by etching. In fact, the plated gold structures 60a, 60b, 62 serve to mask the locally underlying magnetic seed layer 58 so that as etching of the exposed seed layer 58 (i.e., not underlying pads 60a, 60b and bar 62) proceeds, three magnetic structures 60a', 60b' and 62' of gold-upon-high-coercivity-seed-layer are formed on the encapsulation layer 52.

The resulting structure of head 30 includes contact pads 60a, 60b for coupling the magnetoresistive element 40 via its leads 46a, 46b, respectively, to a detection circuit, and also a permanent bar magnet 62' (i.e., the magnetic seed layer portion under gold bar 62).

Figure 3:
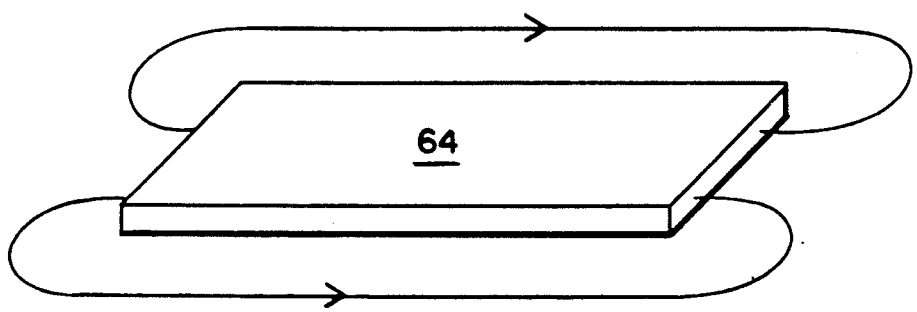
FIG. 3 shows the longitudinal field of a typical bar magnet.

The magnetic field from a simple bar magnet 64 is shown in FIG. 3. Along the sides of the magnet away from the ends a fairly uniform longitudinal field exists. Accordingly, bar magnet 62' shown in FIG. 2(D) should be formed long enough so as to present an essentially uniform longitudinal field over the length of the MR element or at least to the active portion of the MR element lying between the leads, for providing easy axis biasing thereto. With the longitudinal axis of bar magnet 62' aligned with the longitudinal axis of the magnetoresistive element 38, a single domain configuration can be established in the MR element, as will reduce the likelihood of unwanted Barkhausen noise.

In this embodiment, easy axis bias to the MR element is provided by the resulting magnetic structures 62', 60a', 60b', with bar 62' dominating this effect. Alternatively, the magnetic structures 60a', 60b' may be used to provide a transverse hard axis bias component such as by being formed of dissimilar size or location, or the easy-axis-providing bar magnet 62' may be characterized (in shape or orientation) to also provide the hard axis bias itself.

As a result of the foregoing, easy axis biasing can be supplied to a magnetoresistive head without additional process complexity, since the bar magnet 62' is formed simply by modifying the conventional mask already required for forming the contact pads, along with substituting a high coercivity seed layer for the conventional seed layer.

Figure 4A:
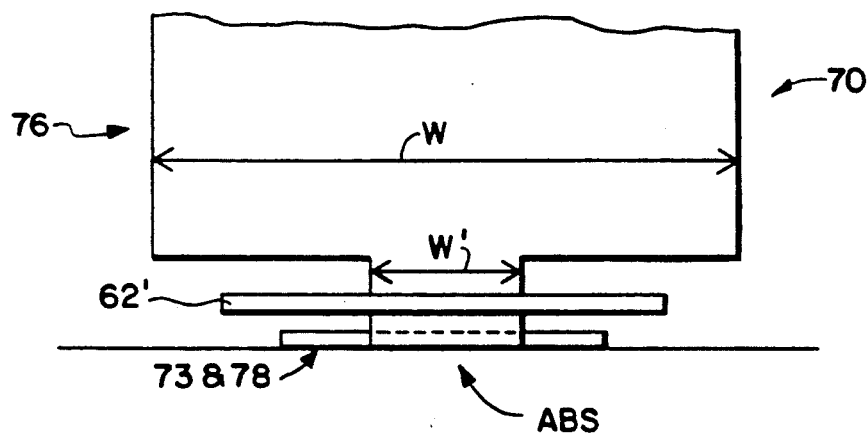
FIG. 4A and 4B provide a top view (4A) and an ABS view (4B) of an alternative embodiment of the present invention.

The foregoing embodiment is generally referred to as an element-in-the-yoke type magnetoresistive head having a bias magnet. In an alternative embodiment, as shown in FIG. 4(A-B), an element-in-the-gap type magnetoresistive head 70 having the bias magnet 62' formed on encapsulation layer 72 is disclosed. In this embodiment, the MR element 73 is formed in the gap g between the tips of poles (or shields) 74, 76, near or adjacent to the air bearing surface (ABS) of the head. In a conventional head these poles would have a width W as shown, even at the air bearing surface, however in the present embodiment, the width of the poles at the air bearing surface is reduced to W', i.e., they are narrowed to a width roughly equal to the track width the data recorded on the disk at pole tips 74', 76'.

This width W' is selected in view of two competing requirements: it must be small enough to avoid shielding the MR element from the desirable easy biasing effects of the magnet 62'; and it must be large enough to provide shielding to the MR element from the flux emanating from tracks adjacent to the track of interest.

Figure 4B:
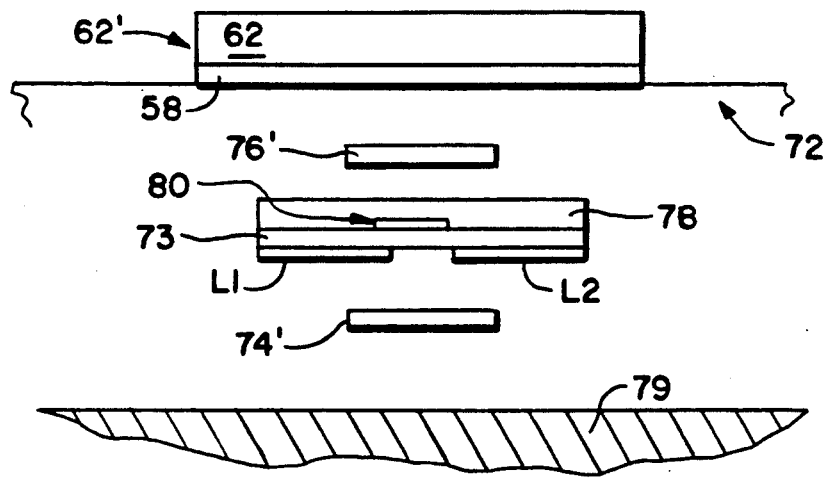

The leads are affixed to the MR element in a conventional manner, and for ease of presentation only, are shown in FIG. 4(B) as L1 and L2. The area of the MR element between the two conductors is the active area where the flux from the disk is sensed. Here the hard axis bias field is perpendicular to the longitudinal axis of the element. Enough hard axis bias must be applied to cause the magnetization to rotate to about 45 degrees from the element's longitudinal axis, so as to obtain maximum sensitivity and linearity of the magnetoresistive effect. Hard axis bias is supplied to head 70 via soft adjacent layer 78.

Soft adjacent layer 78 is magnetically close to the MR element, although insulated therefrom. The dc sense current applied to the MR element via leads L1, L2 produces a field which magnetizes the soft adjacent layer 78. The resultant field in this soft layer reacts back upon the magnetization of the element, providing the required hard axis bias field.

The structure of head 70 includes an insulated substrate base 79 upon which bottom pole 74 is formed (although only pole tip 74' of pole 74 is shown in FIGS. 4(A,B)). MR element 73 is formed on an insulation layer (not shown) over the bottom pole, with a small insulation barrier 80 formed over the central (sensing) portion of the element. The soft adjacent layer 78 is formed on the combined barrier 80 and element 73. The function of barrier 80 is to prevent the soft layer from being in direct magnetic contact with the MR element at that location so as to be able to effectively provide transverse bias thereto. An insulation layer (not shown) is formed over this structure and the upper pole 76 is formed thereon. This workpiece is now covered by encapsulation layer 72, which is then planarized for forming thereon the above-described gold covered bar magnets and contact pads, as shown in FIG. 2. The bar magnet is formed having a thickness chosen according to a desired degree of generated bias.

After the head is fabricated it is subjected to a strong external magnetic field to set the magnetization of the hard layer. The direction of the field is chosen to provide easy axis bias (field parallel to longitudinal axis of the MR element) or alternatively, easy and hard axis bias (by canting the field).

It will be appreciated that, merely by revising the mask required in any event to form the contact pads, it is possible to form the permanent magnet biasing structure of the invention. No additional process steps are required. As well, the thickness of the encapsulation layer, typically 200,000 Å, prevents electrical shorting between the magnet and the MR element. Furthermore, location of the permanent magnet is set back from the ABS so as not to effect the stored data.

It will be understood that the above description pertains to only several embodiments of the present invention. That is, the description is provided by way of illustration and not by way of limitation. The invention, therefore, is to be limited only according to the following claims.

We claim:

1. A thin film magnetic head for sensing of flux from a magnetic storage medium, the head comprising
   a magnetoresistive element and a pole structure, the element and pole structure formed within a means for encapsulating the element and pole structure, such that magnetic flux can flow from an adjacent magnetic medium through the pole structure for sensing of the flux by the magnetoresistive element, and
   magnetic bias means formed on the encapsulation layer for supplying biasing to the magnetoresistive element.

2. The head of claim 1 wherein the bias means comprises a magnetic structure formed of high coercivity material for supplying easy axis biasing to the magnetoresistive element.

3. The head of claim 2 wherein the bias means further comprises a magnetic structure for supplying hard axis biasing to the magnetoresistive element.

4. The head of claim 1 wherein the magnetoresistive element and the pole structure comprise a magnetoresistive read pole including a pole tip portion and a yoke portion which are coupled to each other via the magnetoresistive element, the magnetoresistive element coupled toward its respective ends to respective sense leads, the ends of the sense leads penetrating the means for encapsulating.

5. The head of claim 4 wherein the magnetic structure comprises a NiCo permanent magnet about 2000 Å thick.

6. The head of claim 5 wherein the NiCo is part of a magnetic seed layer formed on the means for encapsulating.

7. The head of claim 6 further comprising a plurality of contact pads terminating the ends of the sense leads and formed on the seed layer isolated from the permanent magnet.

8. The head of claim 7 further comprising at least one additional pole coupled to the pole structure and formed under the means for encapsulating.

9. The head of claim 8 further comprising a write coil lying between the pole structure and the at least one additional pole.

10. The head of claim 9 wherein hard axis bias is supplied to the magnetoresistive element via a soft magnetic layer formed adjacent to the element.

11. The head of claim 1 wherein the pole structure comprises at least two poles coupled together at their distal ends in a yoke region for flux conduction between a magnetic medium and the poles, the proximal ends of the poles ending at an air bearing surface and defining between themselves a gap, the magnetoresistive element formed away from the gap and between the poles.

12. The head of claim 1 wherein the pole structure comprises at least two poles coupled together at their distal ends in a yoke region for flux conduction between a magnetic medium and the poles, the proximal ends of the poles ending at an air bearing surface and defining between themselves a gap, the magnetoresistive element formed in the gap near the air bearing surface.

13. The head of claim 12 wherein at least one pole tip is tapered.

14. The head of claim 3 wherein the magnetic structure comprises a magnetic coil formed adjacent to the pole structure for generating write flux and for supplying hard axis bias to the element.

15. A thin film magnetic head having at least one pole for reading flux from a magnetic storage disk, the head comprising
   a read pole formed within an encapsulated housing structure, the pole having a first magnetic portion magnetically coupled to a second magnetic portion via a magnetoresistive element, the element having sense leads for carrying a sense signal to detection circuitry,
   means for providing easy axis bias to the element, comprising a bar magnet formed from a seed layer of hard magnetic material on the encapsulation layer over and electrically insulated from the element, and
   a pair of contact pads also formed from the seed layer for terminating the MR element sense leads.

16. The head of claim 15 wherein the contact pads and bar magnet each comprise a gold bar formed on a NiCo base.

* * * * *